United States Patent
Pongracz

[15] 3,692,139
[45] Sept. 19, 1972

[54] PARKING DAMAGE PREVENTION
[72] Inventor: Lajos Pongracz, 429 Fairmount Ave. Apt. 110, Jersey City, N.J. 07306
[22] Filed: Feb. 9, 1970
[21] Appl. No.: 9,735

[52] U.S. Cl. .................... 180/94, 188/110, 335/177
[51] Int. Cl. ........................ B60k 27/08, B60t 7/12
[58] Field of Search ...... 180/96, 94, 82, 98; 188/110; 200/61.44; 293/1, 4; 340/61; 317/148.5, DIG. 2; 335/205, 177

[56] References Cited

UNITED STATES PATENTS

| | | | |
|---|---|---|---|
| 3,012,225 | 12/1961 | Holt et al. | 340/61 |
| 2,522,129 | 9/1950 | Mahring | 340/61 |
| 1,758,854 | 5/1930 | Schauman | 180/94 |
| 2,354,687 | 8/1944 | Keith et al. | 188/110 X |
| 2,444,635 | 7/1948 | Dennis | 340/61 |
| 2,588,815 | 3/1952 | Fasolino | 293/4 X |
| 2,991,839 | 7/1961 | DeRemer | 188/110 X |
| 3,409,874 | 11/1968 | Bowler et al. | 200/61.44 X |
| 1,803,292 | 4/1931 | Adler | 180/98 |
| 3,292,052 | 12/1966 | Richer et al. | 317/148.5 |
| 3,411,603 | 11/1968 | Kohls | 180/98 |
| 3,445,796 | 5/1969 | Spiroch et al. | 335/205 |

*Primary Examiner*—Kenneth H. Betts
*Attorney*—Frederic C. Dreyer

[57] ABSTRACT

An automatic braking system for parking which uses electromagnets to sense the proximity of adjacent cars and applies the brakes before actual contact is made. A throttle-limit is preferably included to prevent involuntary override of the brake system by excessive gas pedal travel.

10 Claims, 3 Drawing Figures

INVENTOR
LAJOS PONGRACZ

PARKING DAMAGE PREVENTION

The present invention relates to an automatic system for preventing contact with adjacent vehicles during parking operations and is concerned more particularly with a system for applying the brakes of the parking vehicle upon its approach within a predetermined distance from the adjacent vehicle.

Prior attempts in this area have included mechanical and electrical devices which either apply the brakes; cut-off the ignition; provide a signal such as a horn, or they produce a combination of such effects.

However, the prior systems have required mechanical probes to engage some portion of the nearby vehicle before they can respond to its presence. With the complexity and delicacy of the front and rear decorative areas of today's cars, significant damage can be done to another vehicle by the probes themselves. Such systems, therefore, actually can defeat the purpose for which the driver employs and trusts them.

One facet of the subject appears to have been totally ignored by prior systems. That is, the potential of an involuntary "jump" or a startled reaction by the driver when a system pre-empts control of the vehicle. An apprehensive driver could easily feed excessive throttle to the car at that moment, with a chance of overcoming the brake system and causing the damage he is trying to avoid.

In contrast, the present invention provides a system which includes proximity-responsive electromagnetic elements which actuate the vehicle brakes at a predetermined distance from the adjacent car, without requiring actual contact. Additionally, this invention may provide a throttle-limiting damper to limit normal throttle-linkage travel and prevent inadvertant lunging of the vehicle.

A better understanding of the invention may be derived from the following description and the accompanying drawings in which.

Figure 1:
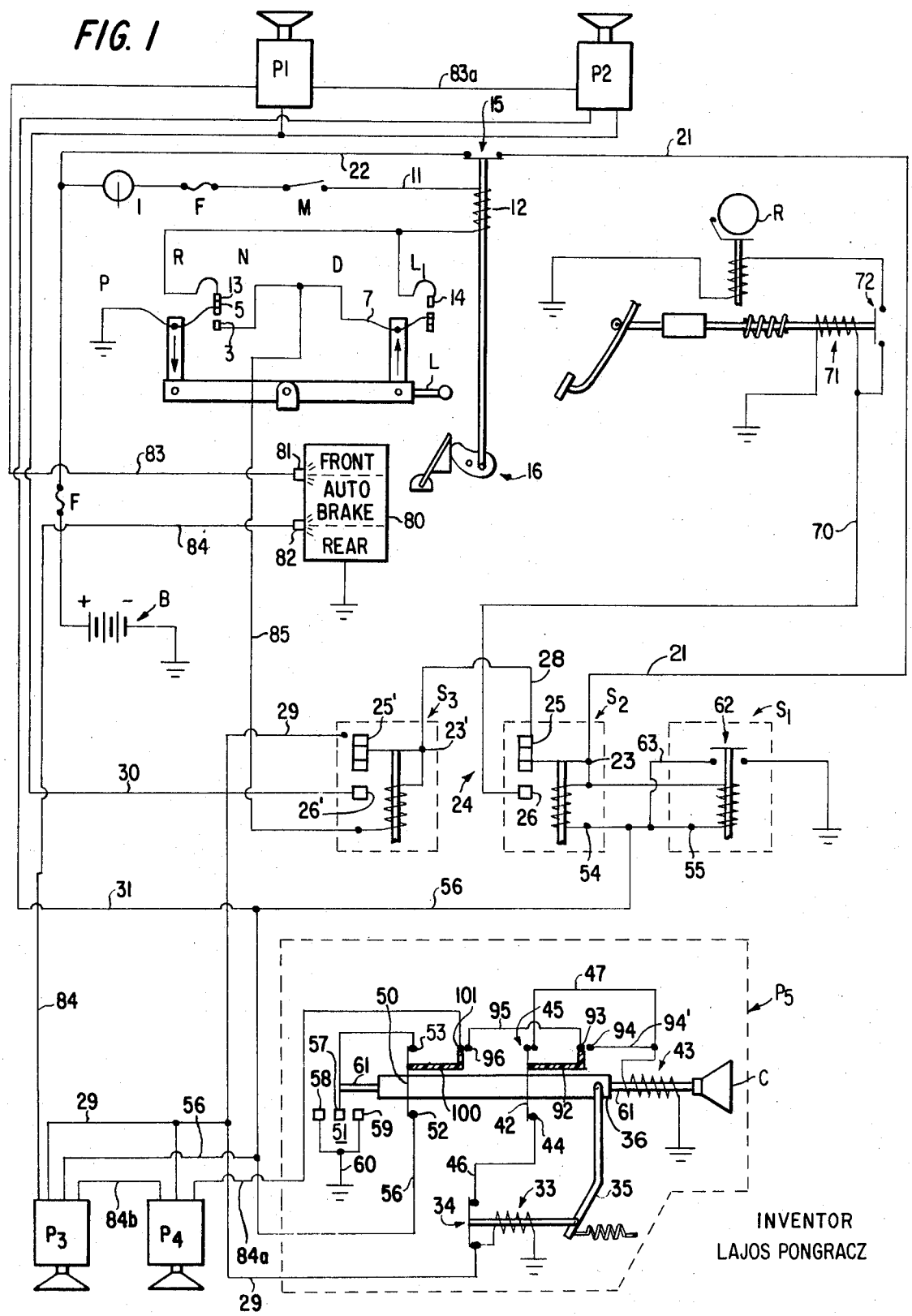
FIG. 1 is a diagram showing the overall system of the preferred form of my invention.

As shown in the drawings, the preferred form of the invention utilizes the conventional battery B of the vehicle, and preferably is connected thereto via the engine ignition switch I and a conventional fuse F. A main switch M feeds a line 11 which leads via a solenoid 12 to a pair of contacts 13 and 14. The contacts 13, 14 are associated respectively with the "Reverse" and "Low" positions of the transmission, as will be discussed more fully hereinafter.

As shown in Fig. 1, the system is "on" and the transmission is in reverse gear, so that the solenoid 12 is grounded via the contact 13 to cause actuation of the solenoid.

The mechanical portion of the solenoid 12, for which I prefer to use a Delco Remy No. 1114356 solenoid, engages both a normally-open switch 15 and throttle-limit 16.

Figure 3:
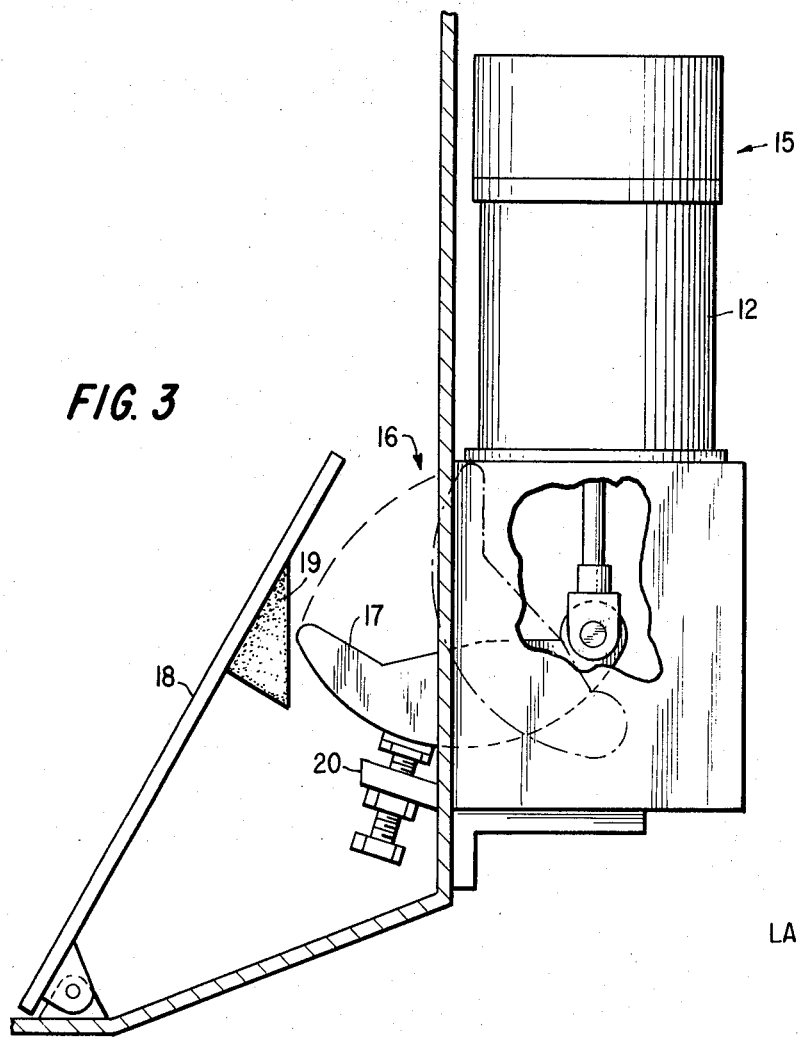
FIG. 3 is an enlarged-scale representation of the throttle-limit of FIG. 1.

The throttle-limit 16, as best shown in Fig. 3, includes a lever 17 hinged on a convenient structure and which is clear of the gas pedal 18, when at rest in the dotted-line position of Fig. 3, but is thrown into the line of travel of the gas pedal when the solenoid 12 is energized. Preferably, a resilient material such as the rubber block 19, is incorporated so that a damping resistance is applied to pedal travel in addition to the travel limit imposed by the lever 17. Adjustment of the lever position may be accomplished by a stop screw 20.

The switch 15, upon aforementioned actuation by the solenoid 12, closes a line 21 with a line 22 supplying power from the battery B. In turn, the line 21 supplies power to a pole 23 of a solenoid $S_2$. The solenoid $S_2$ incorporates a switch 24 having alternate contacts 25 and 26. In the position shown in Fig. 1, the solenoid winding is not grounded, so that the voltage applied to the pole 23 via line 21 is shunted to a pole 23' of a second solenoid $S_3$ by means of a shunt line 28.

The contact 25' of selector solenoid $S_3$ has a line 29 connected there to which supplies the winding of actuating solenoids of a plurality of probe units P3, P4 and P5 at the rear of the vehicle. The alternate contact 26' of solenoid $S_3$ has a line 30 connected thereto which supplies the actuating solenoids of a pair of probes P1, P2 at the front of the car.

The actual number of probes, whether at the front or the rear of the car, may be changed as desired. On trucks, one or more such probe units may be placed on the truck body, if desired, since the several probe units are connected in parallel in both the forward and rear systems.

THE PROBES

For simplicity, the several identical probe units will be described by a representative, detailed description of only one of the units, P5.

The actuating winding of solenoid 33 of probe P5 engages both a switch 34 and a mechanical linkage 35. The linkage 35 engages a probe arm 36 and, on actuation, extends the arm a preset distance of six inches, for example, to protrude outwardly beyond the bumper or other structure of the vehicle. The linkage preferably includes a spring 37 and a conventional hydraulic buffer 38 to prevent slamming of the arm 36 between its extended and retracted positions.

Retraction of the arm 36 is effected by a spring 39, upon de-energization of the solenoid 33. A mechanical stop 40 is positioned on the arm 36 to limit extension of the arm, such as by engaging a pin 41 on a structural member.

The arm 36 also carries a switch arm 42 which energizes an electromagnet 43 by closing across contacts 44 and 45. The contact 44 communicates with switch 34 via a line 46 and the contact 45 with the electromagnet 43 via a line 47.

A second switch arm 50 energizes a motion-sensing limit switch 51 by closing across contacts 52 and 53. The contact 52 is connected to the grounding poles 54 and 55 of solenoids $S_1$ and $S_2$ via a line 56.

The contact 53 is directly connected to the center arm 57 of the motion switch 51. A pair of limit switch contacts 58 and 59 are spaced from the center arm, such as by a centering spring, (not shown) and are grounded in common by a line 60. A sensing-arm 61 is movable with respect to the arm 36 and carries the electromagnet 43 in a fixed relationship to the center arm 57 of the limit switch.

Figure 2:
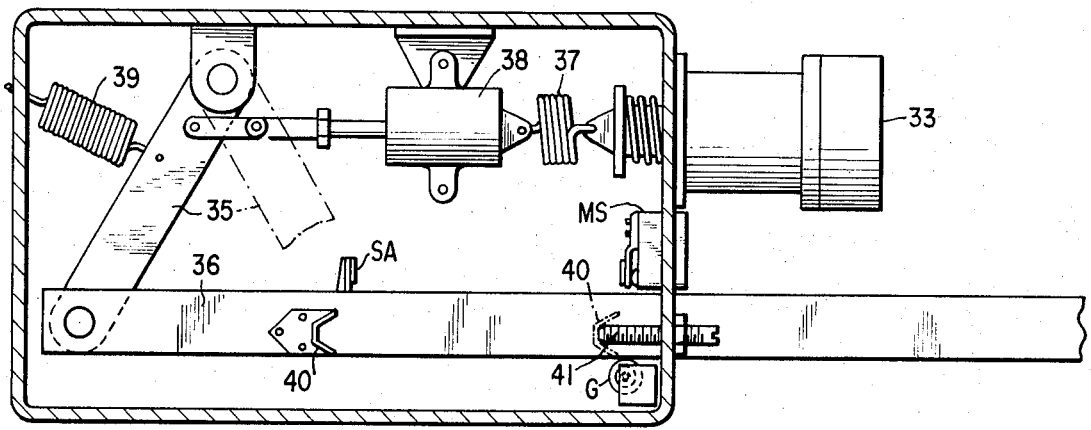
FIG. 2 is an enlarged-scale representation of the probe mechanism of FIG. 1.

As best shown in Fig. 2, I prefer to combine the several switches which are actuated by a switch arms 42 and 50 and are responsive to positioning of the arm 36. They are incorporated in a multi-contact switch MS which is actuated by a switch arm SA mounted on the arm 36. Alignment is preserved by suitable guides such as rollers G.

The precise location of the center arm 57 with regard to the electromagnet should be adjustable to permit initial calibration of the probe upon installation, since response to electromagnet motion in the order of one-tenth inch is considered preferable.

Since certain objects which may be encountered are non-magnetic, such as concrete walls, and particularly in view of the non-magnetic materials being used in portions of today's cars, a rubber cushion "C" preferably is applied to the terminal portion of the sensing arm to protect both the electromagnet and the object which might be encountered.

PROBE OPERATION

With the probe extended and the electromagnet energized, the system remains stable until the sensing arm 61 is disturbed either mechanically or by the approach of a magnetic object such as a car fender or bumper.

Motion of the sensing arm 61 in either direction will close the center contact 57 against on of the contacts 58 and 59, thereby grounding the line 56 via the contacts 53 and 52. Grounding of the line 56 grounds both solenoids $S_2$ and $S_1$ via terminals 54 and 55, thereby causing the windings to pull both switch 24 and a grounding switch 62 which locks the line 56 into ground via a line 63.

Opening of switch 24 de-energizes contact 25, thereby releasing the probe solenoid 33 and allowing the spring 39 to retract the entire probe, thus preventing the probe from causing or receiving damage.

BRAKE ACTUATION

Opening switch 24 from its contact 25 effects closing with the contact 26 of operating solenoid $S_2$ and feeds power via the line 70 to a grounded solenoid 71. The solenoid 71 carries a switch 72 and suitable linkage to depress the brake foot-pedal or an equivalent control member of the braking system. The switch 72 energizes any desired signal such as the warning bell R.

Since the solenoid $S_1$ holds both itself and the line 56 grounded, the brakes will remain locked to ground by solenoid $S_2$, contact 26 and solenoid 71. However, upon shifting, of the transmission out of "reverse", such as by the lever L schematically represented in Fig. 1, contact 13 is disengaged by the contact arm 5 so that the system is released by the solenoid 12.

Further motion of the shift lever into "low" position then re-establishes a ground for the solenoid 12 via the contact 14 and the line 7 to contact 3 and the contact arm 5. However, grounding of the contact 3 also causes grounding of the selector solenoid $S_3$ via line 85 so that the voltage from $S_2$ via shunt line 28 is applied to the front series of probes via contact 26' and line 30.

The circuitry and function of the system for probes P1 and P2 is otherwise the same as the for probe P3 – P5 except that line 30 supplies the windings of the actuating solenoids in P1 and P2, while the line 31 carries the ground of the trip switches by way of a junction with the line 56 serving the windings of $S_1$ and $S_2$. A dash indicator light 80 preferably is incorporated to show the driver that the system is operating properly and may be used with safety. I prefer a dual system employing a "front" and a "rear" indication by bulbs 81 and 82, respectively, served by lines 83 and 84. Preferably, both bulbs are arranged to illuminate a central "auto brake" panel.

The line 84 is connected into each probe circuit at a point which is controlled by the contact arm 42 of the probe. However, the line 84 should not pick up a signal at random from the probes, but should be wired in series so that failure of any single probe will break the circuit to the bulb.

In order to accomplish this with a minimum of switchgear, I prefer to employ contacts mounted on the switch arms 42 and 50 within the probes but insulated from the remainder of the circuit therein except for chosen contacts. Therefore, the contact arm 42 carries an insulating pusher 92 having a contact 93 positioned to engage a contact 94 when the probe is extended.

The contact arm 50 carries an insulating pusher 100 having a contact 101 positioned to engage a contact 96 when the probe is fully extended. A shunt 95 joins contacts 93 and 96. A series line 84a joins the terminal 101 of P5 to the contact 94 of P4, and a series line 84b joins the contact 101 of P4 with the contact 94 of P3. The bulb line 84 is connected to the terminal 101 of P3 to put the corresponding portions of the probes P3 to P5 in series with the bulb. To complete a potential circuit, the probe P5 (most distant from the bulb) is provided with a feed line 94' which joins the contact 94 with the line 47.

The light signal 82 is lighted from the line 47 of probe P5 only if each contact arm of each of the probes P3, P4 and P5 are in operating position. Therefore, failure of any part of the system will warn the driver by lack of the proper light signal.

The system for indicator light 81 is similar to that just described, with a series line 83a performing the function similar to the series line 84a.

Various changes may be made in the details of the invention as disclosed without sacrificing the advantages thereof.

I claim:
1. A vehicle including
a braking system having an actuator,
a supply of electrical power,
at least one electromagnet positioned adjacent an extremity of the vehicle,
mounting means (61) mounting said electromagnet for movement in response to the proximity of a magnetic mass,
a switch connected to selectively energize said electromagnet from said power supply,
position sensing means for sensing changes in position of said electromagnet, and
brake-operating means responsive to said position sensing means for operating said brake actuator in response to a predetermined motion of said electromagnet.

2. A vehicle according to claim 1 including power driving means, a power control for the driving means, and limiting means for limiting said power control in response to a predetermined motion of said electromagnet.

3. A vehicle according to claim 2 in which said power driving means includes an engine having a throttle, and said limiting means is operable to define a predetermined maximum of throttle travel.

4. A vehicle according to claim 1 in which said position-sensing means includes a pair of limit switches (58, 59) positioned to engage said mounting means at different extremes of travel, and said brake-operating means includes a solenoid ($S_2$) responsive to said limit switches.

5. A vehicle according to claim 4 in which said carrying member is mounted on a probe, and extending means (33) for extending said probe outwardly from said vehicle.

6. A vehicle according to claim 5 in which the carrying member is positioned with a portion thereof extending outwardly beyond said probe, whereby it may be mechanically displaced.

7. A vehicle according to claim 6 including a plurality of extensible probes, and means ($S_3$) for selecting and extending said probes in different groups.

8. A vehicle according to claim 7 including a drive transmission having at least a forward drive position and a reverse drive position, and said means for selecting and extending the probe groups includes selector-switch means (13, 14) responsive to said forward and reverse drive positions for selecting the probe group to be extended.

9. A vehicle according to claim 8 including locking means ($S_1$) locking said brake-operating means ($S_2$) in brake-operating condition until said selector-switch means is disengaged.

10. A vehicle according to claim 8 including retracting means (39, $S_3$) responsive to said position-sensing means for retracting the extended probes substantially simultaneously with operation of said brake-operating means.

* * * * *